May 25, 1937. H. A. M. VAN HOFFEN 2,081,517
CONDUCTING RUBBER AND ITS APPLICATION
Filed May 20, 1932
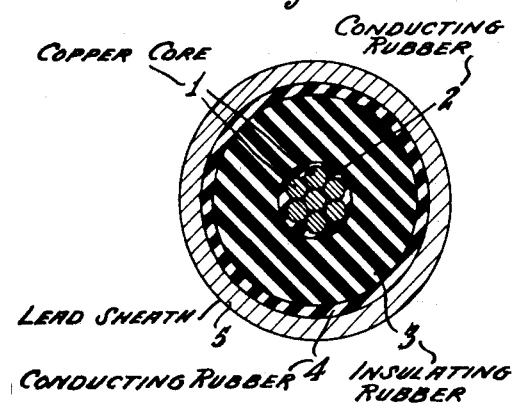
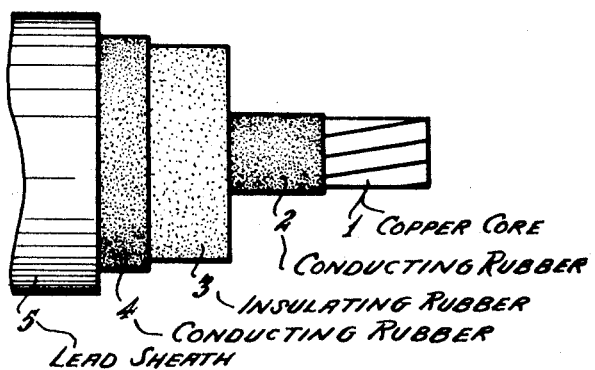
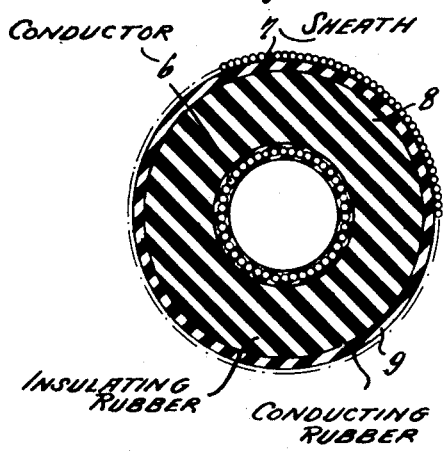
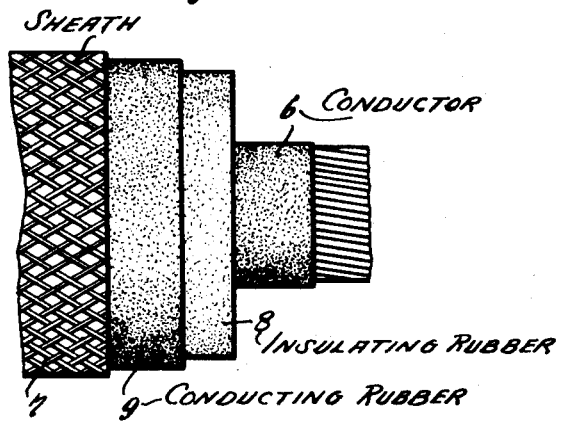
H. A. M. Van Hoffen
INVENTOR
By: Marks & Clerk
Attys.

Patented May 25, 1937

2,081,517

UNITED STATES PATENT OFFICE 2,081,517

CONDUCTING RUBBER AND ITS APPLICATION

Hendrik Adriaan Marius van Hoffen, Amsterdam, Netherlands, assignor to Naamlooze Vennootschap Hollandsche Draad-en Kabelfabriek, Amsterdam, Netherlands, a corporation of the Netherlands Application May 20, 1932, Serial No. 612,617
In the Netherlands September 16, 1931

10 Claims. (Cl. 173—264)

It is known in the art when preparing rubber masses for insulating material or other purposes, to mix the raw rubber with sulphur or other vulcanizing substances with accelerators or the like and finally with fillers. These fillers generally comprise 50–70% of the mixture and exercise a decided influence on the mechanical, as well as on the electric properties of the rubber.

It has been discovered that the influence exercised by the different fillers on the electric properties of the rubber strongly depends on the inherent electric properties of the fillers. It has been proved, for instance, that the conductivity of a rubber mixture for direct current may be increased from 5–10 times by adding only a few percent of carbon. As is known, the addition of carbon, which until now only occurred in small quantities in the shape of gas black or the like, produces a rubber with better mechanical properties, and up to the present the improvement of the mechanical properties has been the only object of the addition of carbon.

Small quantities of carbon have also been added to improve the rubber in certain respects for insulation purposes.

The present invention has for its purpose to reduce the insulating properties of the rubber and consists in adding to the rubber substances which render the same conducting; preferably these substances are added in a finely divided condition.

The invention furthermore relates to conductors, condensers and the like consisting partly or entirely of conducting rubber.

It has been found that the quantity of the carbon to be added greatly depends on the size of the grain, and also on the nature of the carbon. When using certain products it is possible to obtain a mixture of e. g. 70% carbon and 30% rubber which can still comparatively easily be mixed, rolled and vulcanized. The product thus obtained still sufficiently possesses the mechanical properties of rubber, so that it can be used for special purposes. Some of these uses will be specified later on.

The specific resistance to direct electric current is of 1 ohm per cubic centimetre.

The specific resistance of most resistance wires is of the order of $10^{-4}$ ohm per cu. cm., that of the normal kinds of rubber used as insulation material $10^{16}$ ohm per cu. cm.

It is evident from these figures that the rubber composed according to the invention may be counted amongst the electric conductors.

It has furthermore been found that besides carbon other conducting substances, as e. g. metals may be used, so that the invention is by no means restricted to the use of carbon. The metals should however be sufficiently finely divided.

By the proper choice of the quantity of the conducting substance it is possible to regulate very minutely the resistance of the rubber.

Conducting rubber is chiefly appropriate for use in high tension practice, especially where rubber is employed as a high tension insulating material.

The fact that rubber has been used in high tension practice very little until now, is due to the difficulty of applying the same sufficiently adhering to the conductor.

Very small vacuum spaces, or spaces containing air or other gases of normal or subatmospheric pressure produce very strong electric fields, ionization, formation of ozone and a rapid deterioration of the rubber insulation.

It was of great importance to find a solution for this difficulty, as certain kinds of rubber possess a very great disruptive strength even of 30–40 kilovolt per millimetre. This quality however could not be utilized, as long as there was no known method to have the conductor applied in so intimate contact with the rubber insulation that the formation of ozone could be avoided.

The present invention enables the use, as the conductor or part of the conductor, conducting rubber adhering very closely to the rubber insulation.

Preferably the whole unit consisting of conductor and insulation is first composed and afterwards vulcanized.

By the vulcanization process a very close union between the insulation and the conducting rubber is obtained.

The use of conductive rubber is of great importance for manufacturing the high tension cable described below which is characterized in that one or several of the conductors are wholly or partly consisting of conducting rubber.

The expression "conductor" applies to the essential current—conducting conductors as well as to the earth sheath.

The cable may be constructed for instance by applying a thin non-vulcanized layer of conducting rubber on the conductor. Around this layer the likewise non-vulcanized layer of rubber which is to form the insulation is applied.

Finally another thin layer of conducting rubber may be applied which with the lead sheath or other conducting covering if any constitutes the earth sheath.

The whole is then vulcanized, which causes the union between the conducting and the insulating rubber to be so firm that the formation of interstices is excluded. The whole may be vulcanized in the metal sheath, in which case a very intimate contact is obtained.

A cable according to the invention is shown in Figures 1 and 2. 1 is the copper core, 2 the thin layer of conducting rubber, 3 the insulating layer, 4 the thin layer of conducting rubber and 5 the lead sheath.

Figures 3 and 4 show a more specific construction of this cable.

As an example a flexible cable with a hollow core is represented. The conductor 6 may consist of a thin conducting rubber tube, or, if the resistance of the same should be too high, of a braiding arranged in a layer of conducting rubber. 8 is the real insulation, 9 the external layer of conducting rubber, which may still be covered by a copper braiding 7.

Conducting rubber can be used in the construction of high tension cables in all cases where a close union between conductor and insulation is desired.

The invention enables the use of rubber as insulation without the well known drawbacks. This presents a great many advantages:

1. Rubber is homogenous and resilient shrinkage and distension on account of changes in temperature do not give rise to the formation of interstices in the insulation, so that ionization and dielectric losses do not occur.

2. Certain kinds of rubber possess a disruptive strength of 30–40 kilovolts per mm.; a thin layer of insulation is therefore sufficient as the admissible maximum voltage is much higher than that for layers of impregnated paper. This means a considerable saving especially for one-phase cables, as this saving also extends to the expensive bronze armouring, as the cable will be materially thinner.

3. The dielectric constant of rubber may, by the mere choice of fillers, be made to vary between 3–3.5 and 5–6.

The arrangement of several layers of insulating material with dielectric constants progressively decreasing is therefore an easy matter.

In the manufacture of paper cables special measures are needed for this purpose (e. g. pressing the paper) giving rise to difficulties and only producing a partial solution.

The union between the different layers of rubber is very firm, provided that the whole is vulcanized when all the layers are in place.

4. It is now also possible to produce flexible cables for very high voltage.

5. It is easily possible to apply intermediate conducting layers which render it possible to control the distribution of the tension in the dielectric, by arranging a thin layer of conducting rubber which in order to decrease the resistance may contain metallic conductors, e. g. copper wire, between the insulating layers.

A second example of the use of conducting rubber is the construction of a rubber insulated high tension condenser.

This condenser may for instance be constructed by rolling up together two long thin strips of insulating rubber and two likewise long thin strips of conducting rubber. The strips must be rolled up together in a non-vulcanized condition and in such a manner that the strips of conducting and insulating rubber alternate and the layers of conducting rubber protrude a little, one strip on the one side, the other strip at the other side. The whole is vulcanized in a mould in such a way that the edges of the conducting rubber strips protruding to the left and to the right are united. In this manner a very good condenser for very high tension is obtained.

As another embodiment of the invention a high tension leading-in insulator as used for instance for the connection of the supply mains for the high tension winding of transformers may be mentioned.

The construction of this kind of insulators is very similar to that of the cables; in this case also different materials with decreasing dielectric constants are used as well as intermediate conducting layers, whilst the presence of interstices is also very detrimental.

The leading-in insulator according to the invention consists of a conductor covered alternately with layers of conducting and insulating rubber. The first layer of conducting rubber is arranged on the conductor. The construction can be such that the capacities of the consecutive condensers have predetermined values. If no intermediate conducting layers are used, several layers of rubber, with progressively decreasing dielectric constants can be applied.

Conducting rubber may be also used to advantage for cable joints as well as for cable sealing boxes.

According to an embodiment of the invention the layer of conducting rubber may also be applied in liquid form as a rubber solution in an organic solvent, and vulcanized together with the insulating rubber. The rubber solution may be spread or otherwise applied on the surface to be covered with conducting rubber, this treatment may be repeated several times, if a heavier layer is desired. Preferably solutions in volatile solvents are used, the solvent being evaporated partly or entirely after application of the solution.

It is however also possible to use rubber solutions in non-volatile solvents, as e. g. vegetable oils.

The use of conducting rubber in the shape of a solution is especially important where a very thin layer of conducting rubber is desired.

Whilst with solid rubber it is not possible to obtain layers of a thickness below ½ millimetre, it is very easy to obtain much thinner layers when using solutions.

The use of rubber solutions possesses special advantages for cables with intermediate conducting layers and generally speaking in those cases where rubber is used as an insulating material and it is desired to control the distribution of the tension in the dielectric. For purposes of this nature the layer of rubber obtained in the manner described above possesses special advantages because of its thinness.

A cable with rubber insulation for high voltages in which rubber solutions are used for the external sheath of each core may be obtained in the following manner:

A thin layer of conducting rubber obtained by mixing solid rubber with fillers and a thick layer of insulating rubber are applied around the conductor.

The insulated core is now immersed once or several times into a solution of conducting rubber e. g. a solution in benzole of rubber to which finely divided carbon has been added. After immersion into the solution artificial drying may be applied thereby congealing or indurating the rubber in situ. Finally the whole is vulcanized according to one of the usual methods. In this manner around each core a very thin conducting layer is formed which is firmly united with the insulation.

If the conductivity of the thin conducting layer should be too low in the longitudinal direction of the cable to lead away the charging current of a cable length without too much voltage drop, the conductivity of the layer may be increased by applying a thin wire winding, or by other known means.

The use of conducting rubber is not restricted to the embodiments mentioned above; the invention renders it possible to use rubber with its particular mechanical properties in all cases where an insulation for very high voltages is needed.

I claim:—

1. In the manufacture of insulated electric conductors the process which comprises applying to a conductor a solution of rubber containing a conducting substance suspended therein, indurating such solution to form around the conductor a layer of unvulcanized conducting rubber and vulcanizing said rubber layer.

2. In the manufacture of insulated electric conductors the process which comprises applying to a conductor a solution of rubber containing finely divided carbon suspended therein, indurating such solution to form around the conductor a layer of unvulcanized conducting rubber and vulcanizing said rubber layer.

3. In the manufacture of insulated electric conductors the process which comprises applying to a conductor two superposed layers of unvulcanized rubber, one being an insulating layer, the other one being the residue, obtained by induration, of a solution of rubber containing a finely distributed conducting substance suspended therein, and combining said layers by simultaneous vulcanization.

4. In the manufacture of insulated electric conductors the process which comprises applying to a conductor two superposed layers of unvulcanized rubber, one being an insulating layer, the other one being the residue, obtained by induration, of a solution of rubber containing finely divided carbon suspended therein, and combining said layers by simultaneous vulcanization.

5. In the manufacture of insulated electric conductors the process which comprises applying to a conductor a layer of unvulcanized rubber and a finely subdivided conducting substance admixed with said rubber, enclosing said layer in another layer of non-conducting, insulating rubber, depositing on said insulating layer a liquid layer by applying thereto a rubber solution containing a finely distributed conducting substance uniformly suspended therein, indurating the solution in situ and subjecting the assembled layers to vulcanization.

6. In the manufacture of insulated electric conductors the process which comprises applying to a conductor a layer of unvulcanized rubber and finely divided carbon admixed with said rubber, enclosing said layer in another layer of non-conducting, insulating rubber, depositing on said insulating layer a liquid layer by applying thereto a rubber solution in an organic solvent containing finely divided carbon uniformly suspended therein, indurating the solution in situ and subjecting the assembled layers to vulcanization.

7. The process which comprises building up around a conductor an assemblage of layers of rubber of different composition in contact with each other, at least one of said layers being of conducting rubber formed from a solution of rubber in a suitable solvent, in which is suspended a finely distributed conducting substance, followed by induration in situ, a second of said layers in contact with said first layer being of insulating rubber composition, and vulcanizing said assemblage as a whole.

8. The process of claim 7, in which the resulting conducting layer does not exceed 0.5 millimetre in thickness.

9. The process which comprises producing about a conductor an assemblage of rubber layers from applied rubber solutions containing finely distributed conducting substances suspended therein and indurating said applied layers in situ, the said layers being of progressively decreasing dielectric constant outwardly.

10. The process of producing electric cables which comprises pressing around an electric conductor a layer of a mixture of unvulcanized rubber and a finely distributed conductive substance, forming about this conductive layer an insulating layer of unvulcanized rubber, applying to said insulating layer a solution of rubber in which is suspended a finely subdivided conducting substance, removing the solvent to form a layer of conducting rubber and subjecting the whole to vulcanization.

HENDRIK ADRIAAN MARIUS van HOFFEN.